(No Model.)

P. W. TILLINGHAST.
VELOCIPEDE.

No. 486,914. Patented Nov. 29, 1892.

Witnesses
Chas. F. Schmelz.
W. L. Perham.

Inventor
Pardon W. Tillinghast,
By his Attorney
J. Schofield

UNITED STATES PATENT OFFICE.

PARDON W. TILLINGHAST, OF PROVIDENCE, RHODE ISLAND.

VELOCIPEDE.

SPECIFICATION forming part of Letters Patent No. 486,914, dated November 29, 1892.

Application filed May 11, 1891. Serial No. 392,393. (No model.)

*To all whom it may concern:*

Be it known that I, PARDON W. TILLINGHAST, a citizen of the United States, residing at Providence, in the State of Rhode Island, have invented a new and useful Improvement in Velocipedes and Similar Vehicles, of which the following is a specification.

The nature of my invention consists in the improved construction of the hollow pneumatic tire and in the improved construction and arrangement of an air-pump for inflating the tire, as hereinafter fully set forth.

Figure 1:
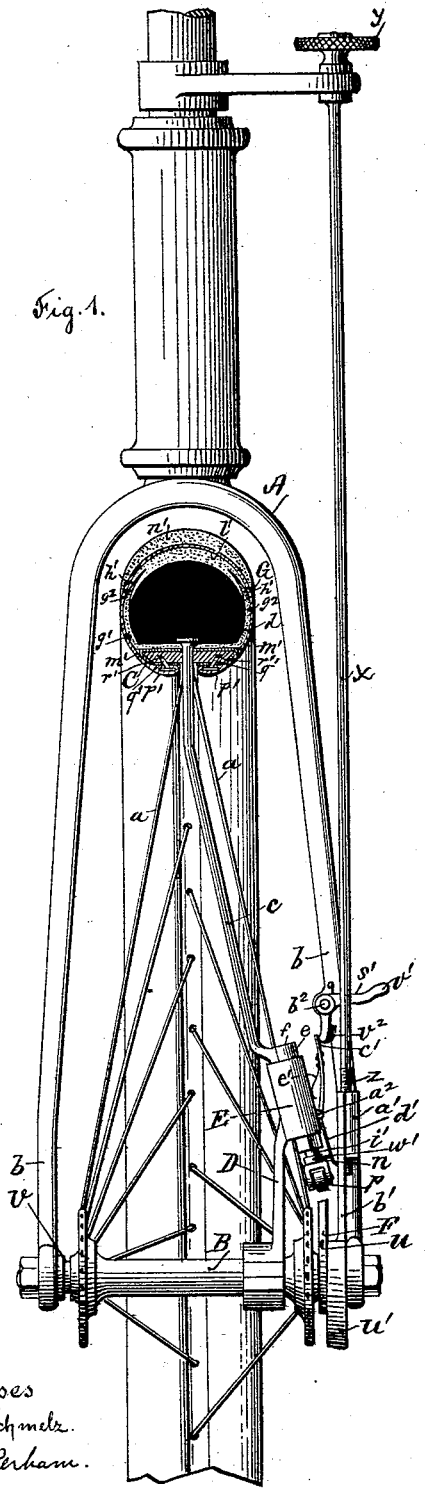
Figure 2:
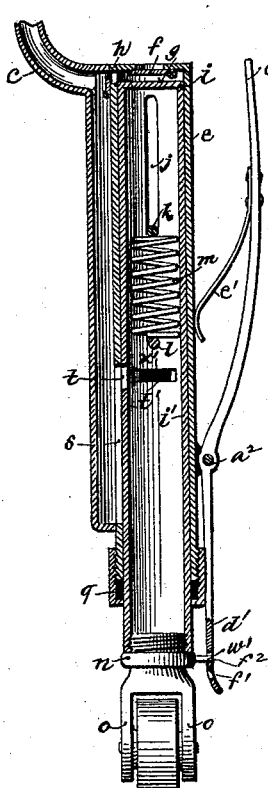
Figure 3:
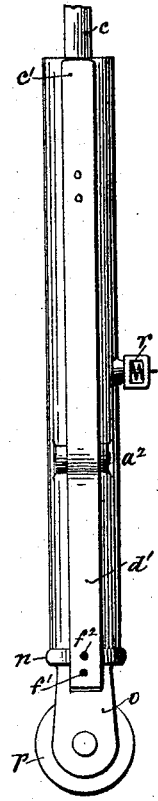
Figure 4:
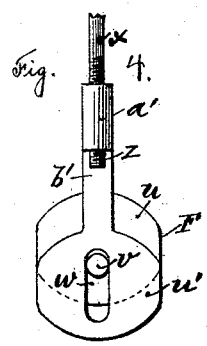

Figure 1 represents a sectional view showing a portion of the steering-wheel and a side view of the pump for supplying air to the hollow tire. Fig. 2 represents a longitudinal section of the pump. Fig. 3 represents a front view of the same. Fig. 4 represents a side view of the adjustable cam for operating the pump.

In the accompanying drawings, A represents the steering-fork, B the hub of the wheel, and C the rim connected to the hub by means of the spokes $a$ $a$. To the hub B, which is held loosely upon the axle or rod $v$, extending from one arm $b$ to the other of the steering-fork A, is secured the arm D, which is adapted to revolve with the wheel and carry the air-pump E, the said pump being provided with an exhaust-pipe $c$, which passes through a perforation in the rim C of the wheel and enters the cavity $d$ of the hollow tire G. The pump E, which revolves with the wheel, consists of the barrel $e$, provided at its forward end with the inlet-valve $f$ for the admission of air to the chamber $g$ of the pump and the exhaust-valve $h$ for the passage of air from the chamber of the pump to the air-chamber of the tire through the pipe $c$. The piston $i$ of the pump is made of a tube $i'$, provided with slots $j$, through which a fixed pin $k$ is made to pass to the opposite sides of the barrel $e$, thus serving to prevent the piston $i$ from turning and to limit the movement of the same, and between the fixed pin $k$ and the pin $l$, which is held in the sides of the tube $i'$, is placed the spiral spring $m$, which will serve to actuate the piston in the backward direction to draw air into the chamber $g$, and the rear end of the tube $i'$ is tightly closed by means of the screw-plug $n$, provided with the ears $o$ $o$, which support the friction-roller $p$. The joint between the piston-tube $i'$ and the barrel $e$ is rendered air-tight by means of the stuffing-box $g$, and to the side of the barrel $e$ is attached the relief-valve $r$, which may be set to exhaust at any required degree of pressure, and communication is made from the chamber $d$ of the tire to the relief-valve $r$ through the slot $s$ in the barrel $e$ and the openings $t$ and $t'$ in the piston-tube $i'$, the pressure of air in the cavity of the tube $i'$ being at all times equal to the pressure of the air in the chamber of the tire, the narrow passage $x'$, leading to the relief-valve, being covered by the side of the tube $i'$ when the pump is in operation. The piston of the pump E is operated by means of a stationary cam F, which is preferably made adjustable, as shown in Fig. 4, one part $u$ of the cam being firmly attached to the rod $v$, upon which the wheel turns, and the other part $u'$ being provided with a slot $w$, which embraces the rod $v$, and is adjustably operated to increase or diminish the throw of the piston of the pump by means of the journaled rod $x$, provided with the milled head $y$ and the screw-thread $z$, which enters the nut $a'$ upon the shank $b'$ of the cam portion $u'$, and in order to provide for the disengagement of the roller $p$ from the surface of the cam F, so as to render the pump inoperative, a catch $d'$ is provided, pivoted to one side of the barrel $e$ at the point $a^2$ and operated for engagement with the pin $w'$ upon the side of the screw-plug $n$ by means of the spring $e'$. The forward end of the catch $d'$ is provided with the notches or perforations $f'$ $f^2$, which serve to hold the piston, when disengaged from the cam F, in two separate positions of adjustment. A spring-operated lever $s'$ is attached to the side of the arm $b$ of the fork A by means of the pivot-screw $b^2$, so that by pressing with the foot upon the horizontal arm $v'$ of the said lever the arm $v^2$ will be thrown inward to engagement with the rearward end $c'$ of the catch $d'$ upon the revolution of the wheel, whereby the piston will be released from the catch and will then be thrown by the action of the spring $m$ into engagement with the cam F.

The hollow tire G is constructed as follows: To the outer side of the rim C of the wheel is cemented the rubber ring $g'$, which is provided with the opposite flanges $g^2$ $g^2$, the outer edges of which are embraced by the grooved edges $h'$ of the rubber ring $l'$, thus inclosing an annular chamber $d$, and over the ring $l'$ and the flanges $g^2$ $g^2$ of the ring $g'$ is placed the outer ring $m'$, which is formed of canvas or similar material coated with rubber, and preferably provided with a thickened portion $n'$, of rubber, which forms the tread of the tire. The edges $p'$ of the outer ring $m'$ are provided with the hocks $q'$, which enter the inclined openings $r'$ in the back of the rim C and upon the subsequent inflation of the tire serve to hold the same in proper position upon the rim of the wheel.

When the piston of the pump is in engagement with the cam F, the rider by turning the milled head $y$ of the screw-rod $x$ can adjust the throw of the piston, as desired, to secure the required air-pressure in the tire, the throw of the piston becoming greater as the two parts $u$ and $u'$ are made to coincide with each other and less as they are separated, and the catch $d'$ is so arranged that when the parts $u$ and $u'$ are separated at their greatest distance the pin $w'$ will enter the notch $f^2$, thus holding the piston $i$ in its extreme forward position and disengaged from the cam, the passage $x'$ to the relief-valve $r$ being uncovered, as shown in Fig. 2, whereby the air will be allowed to escape through the relief-valve until the required minimum pressure in the tire is reached, and whenever it is desired to disengage the pump from the cam without reducing the pressure in the tire the movement of the part $u'$ from the part $u$ of the cam F is to cease until the pin $w'$ enters the notch $f'$ of the catch, at which position of the piston the passage $x'$ to the relief-valve will be covered by the side of the tube $i'$, thus preventing the escape of air through the said valve.

I claim as my invention—

1. The combination, with a hollow pneumatic tire and an air-pump connected with the tire and revolving with the wheel, of a cam attached to the supporting-frame for the wheel for operating the piston of the pump, substantially as described.

2. The combination, with a hollow pneumatic tire and an air-pump connected with the tire and revolving with the wheel, of an adjustable cam attached to the supporting-frame for the wheel and adapted to change the throw of the piston of the pump, substantially as described.

3. The combination, with a hollow pneumatic tire and an air-pump connected with the tire and revolving with the wheel, of the cam made in two sections, the one attached to the supporting-frame for the wheel and the other made movable at the will of the rider to change the throw of the piston, substantially as described.

4. The combination, with the hollow pneumatic tire, of an air-pump connected with the tire and revolving with the wheel, a cam for operating the piston in one direction, a spring for operating the piston in the opposite direction, a catch for holding the piston of the pump in a position of disengagement from the cam, and means for releasing the piston from the catch at the will of the rider, substantially as described.

5. The combination, with a hollow pneumatic tire, of an air-pump connected with the tire and revolving with the wheel and provided with a relief-valve and with a piston having an opening which is in communication with the chamber of the hollow tire and adapted to register with the passage to the relief-valve upon the farthest disengagement of the piston from its operating-cam, a cam for operating the piston in one direction, a spring for operating the piston in the opposite direction, a catch for holding the piston in its position of disengagement from the cam, and means for releasing the piston from the catch at the will of the rider, substantially as described.

6. An inflater for pneumatic tires, having an air-compressing cylinder carried by the wheel-hub, the compression in said cylinder being effected by the revolution of the wheel.

PARDON W. TILLINGHAST.

Witnesses:
S. SCHOLFIELD,
E. M. TILLINGHAST.